United States Patent [19]

Araki

[11] Patent Number: 4,495,455

[45] Date of Patent: Jan. 22, 1985

[54] MULTI-PHASE STEPPING MOTOR CONTROLLER

[75] Inventor: Shigeyuki Araki, Komae, Japan

[73] Assignee: Ricoh Company, Ltd., Tokyo, Japan

[21] Appl. No.: 467,981

[22] Filed: Feb. 18, 1983

[30] Foreign Application Priority Data

Feb. 22, 1982 [JP] Japan ................... 57-27240

[51] Int. Cl.³ ............................................ H02K 29/04
[52] U.S. Cl. ................................... 318/696; 318/685
[58] Field of Search ............. 318/696, 685; 310/49 R

[56] References Cited

U.S. PATENT DOCUMENTS 3,381,193 4/1968 Smith .................................. 318/696
3,445,741 5/1969 Gerber ................................ 318/696

Primary Examiner—J. V. Truhe
Assistant Examiner—Saul M. Bergmann
Attorney, Agent, or Firm—David G. Alexander

[57] ABSTRACT

A control system for a stepping motor in which a current (or voltage) to be fed to each excitation coil of the motor at the timing for an m-phase excitation is different from a current (or voltage) to be fed at the timing for an n-phase excitation. This difference in current (or voltage) causes a same torque to develop both in the m-phase excitation and n-phase excitation.

11 Claims, 11 Drawing Figures

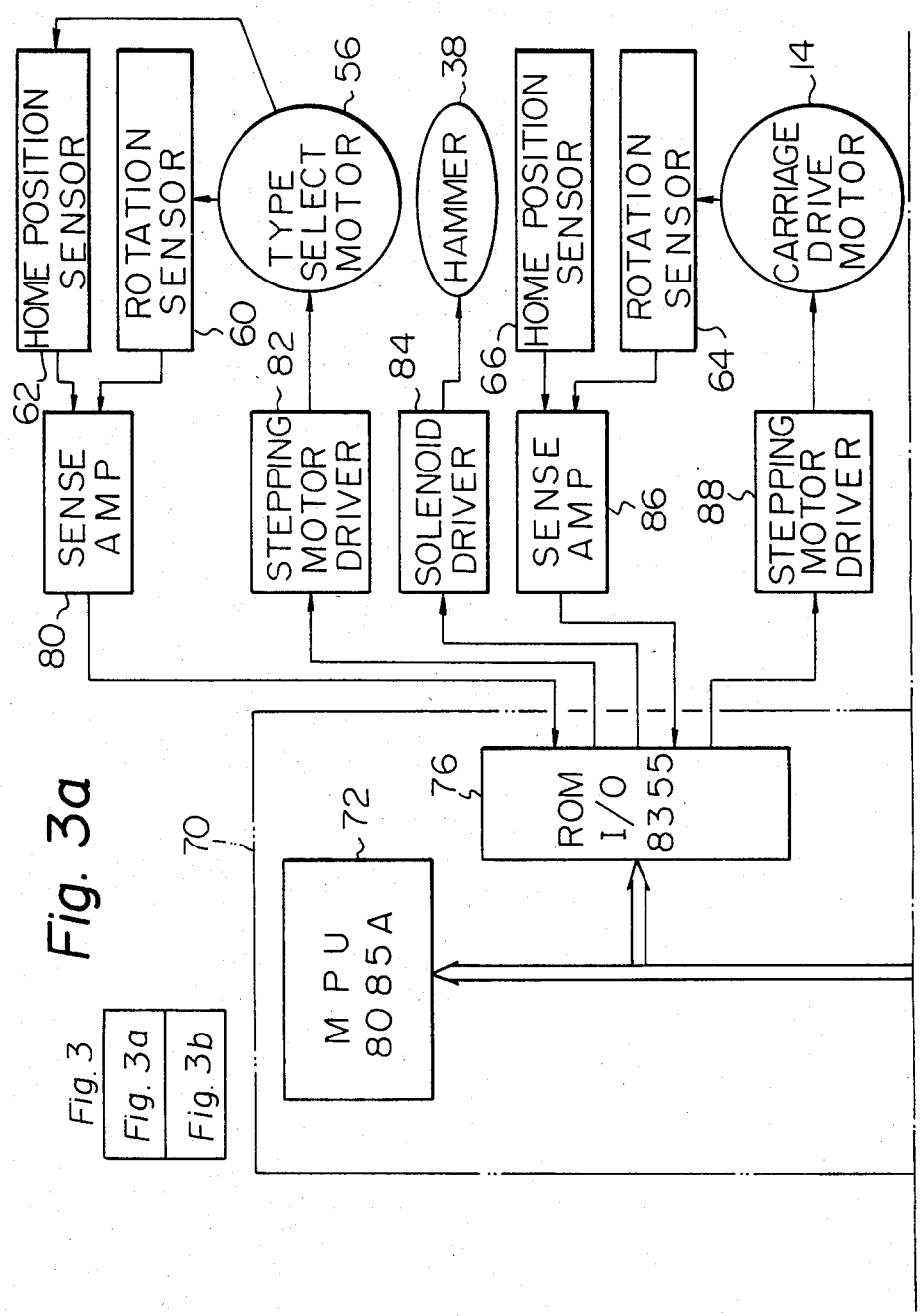

MULTI-PHASE STEPPING MOTOR CONTROLLER

BACKGROUND OF THE INVENTION

The present invention relates to a multi-phase stepping motor controller and, more particularly, to a controller of the type which drives excitation coils of a multi-phase stepping motor by a number which differs from one timing to another such as an alternate one phase, two phases basis, two phases, three phases basis or three phases, four phases basis.

Typical of such stepping motor drive systems may be the alternate one phase, two phases system which will be described below with reference to Table, which pertains to a 4-phase stepping motor by way of example.

TABLE

| Phase | \multicolumn{15}{c}{Step} |
| --- | --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 | 14 |
| $\phi 1$ | o | o | | | | | | o | o | o | | | | | |
| $\phi 2$ | | o | o | o | | | | | o | o | o | | | | |
| $\phi 3$ | | | o | o | o | | | | | | o | o | o | | |
| $\phi 4$ | | | | | o | o | o | | | | | | o | o | o |

It will be noted in Table that the respective phases are excited as indicated by circles.

In the exemplary 1-phase, 2-phase excitation mode shown in Table, the phases $\phi_1$–$\phi_4$ are excited one at a time at each even step and neighboring two phases at a time at each odd step. In short, 1-phase excitation and 2-phase excitation repeatedly occur in an alternate fashion. With this drive principle, not only the angular step of the stepping motor can be made one half the original to promote accurate motor drive but the transitional response characteristic during single step drive becomes as desirable as during 2-phase excitation.

It has been customary to drive a stepping motor by connecting a switching transistor or the like to a coil for each phase and applying a predetermined voltage (or current) in the form of a pulse to the coil to produce a predetermined drive force. Although the static torques and rotational angles developed by the coils of the motor for the respective phases are approximately in a sinusoidal relation, the torque differs from 1-phase excitation to 2-phase excitation in the alternate 1-phase, 2-phase mode. Should such a motor be used as a spacing motor for moving a carriage of a printer, for example, the difference in torque would cause the carriage to undergo an irregular amount of hunting in the event the carriage is stopped. Difficulty would thereby be brought about in stopping the carriage accurately at a predetermined position. The torque variation holds true not only for the alternate 1-phase, 2-phase excitation mode in a 4-phase stepping motor but for the 2-phase, 3-phase mode, 3-phase, 4-phase mode or the like in a stepping motor having a desired number of phases.

Supposing that Ta is a maximum torque value and that the rotational angle of a motor is $\theta$ and that the torque developed by phase $\phi_1$ is $TaCos\theta$, the torque developed by phase $\phi_2$ will be $TaSin\theta$ while the torque developed by simultaneous 2-phase excitation will be $\sqrt{2}\, TaSin(\theta + \pi/4)$. This teaches that the torque produced by a 2-phase excitation is $\sqrt{2}$ times the torque produced by a 1-phase excitation. Therefore, for the alternate 1-phase, 2-phase excitation of a 4-phase stepping motor, it will suffice to apply a voltage to each coil during 1-phase excitation which is $\sqrt{2}$ times the voltage to be applied during 2-phase excitation. Based on the same principle, a specific coefficient will be obtained to determine a power ratio for a stepping motor having any other number of phases or for a excitation system other than the alternate 1-phase, 2-phase.

The present invention contemplates to embody the basic idea described above.

SUMMARY OF THE INVENTION

It is an object of the present invention to provide a multi-phase stepping motor controller which stops a drive system associated with a stepping motor accurately at a predetermined position by smoothly driving the motor with an even torque and thereby grasping the hunting situation of the drive system.

It is another object of the present invention to provide a multi-phase stepping motor controller which controls the motor by each small step angle and sets up a desirable transitional response characteristic.

It is another object of the present invention to provide a generally improved multi-phase stepping motor controller.

A stepping motor controller embodying the present invention controls a stepping motor having multiple phases and excitation coils therefor in which m and n motor phases are alternately excited to drive the motor. The controller comprises excitation means for energizing m excitation coils at a first predetermined timing to excite the m motor phases and sequentially energizing n excitation coils at a second predetermined timing to excite the n motor phases. Control means controls the excitation means to energize the m and n excitation coils such that the magnitude of energization for the m excitation coils is equal to that of energization for the n excitation coils which is multiplied by a coefficient k, which is greater than 1.

In accordance with the present invention, a control system for a stepping motor is disclosed in which a current (or voltage) to be fed to each excitation coil of the motor at the timing for an m-phase excitation is different from a current (or voltage) to be fed at the timing for an n-phase excitation. This difference in current (or voltage) causes a same torque to develop both in the m-phase excitation and n-phase excitation.

The above and other objects, features and advantages of the present invention will become apparent from the following detailed description taken with the accompanying drawings.

BRIEF DESCRIPTION OF THE DRAWINGS

FIG. 2b is an enlarged section along line II—II of FIG. 2a;

FIG. 3 is a diagram illustrating how FIGS. 3a and 3b are combined to constitute a block diagram showing an electrical arrangement of the printer;

FIG. 7b is a timing chart representing the operation of the controller shown in FIG. 7a.

DESCRIPTION OF THE PREFERRED EMBODIMENTS

While the multi-phase stepping motor controller of the present invention is susceptible of numerous physical embodiments, depending upon the environment and requirements of use, substantial numbers of the herein shown and described embodiments have been made, tested and used, and all have performed in an eminently satisfactory manner.

Figure 1:
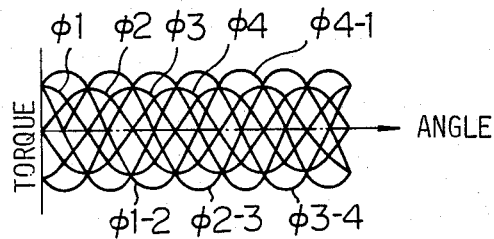
FIG. 1 is a torque diagram representing the operation of a prior art stepping motor control system.

Referring to FIG. 1 of the drawings, the graph shows a relationship between static torques and rotational angles which is attainable with excitation coils of different phases of a stepping motor in accordance with a prior art control system. It will be seen that the relationship is approximate to a sinusoidal waveform. It will also be seen that where alternate one phase, two phases drive is employed for the stepping motor, for example, the torque differs from the excitation of one phase to the concurrent excitation of two phases. Naturally, such a phase number dependency of the torque is undesirable due to the result previously discussed.

Hereinafter will be described preferred embodiments of the present invention which eliminate the conventionally experienced problem and capable of driving a stepping motor with a constant torque.

Figure 2A:
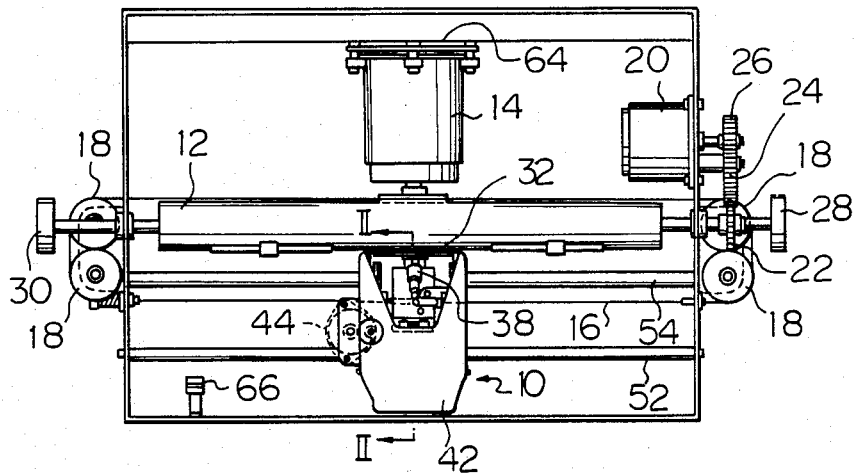
FIG. 2a is a plan view of a printer to which the multi-phase stepping motor controller of the present invention is applicable.
Figure 2B:
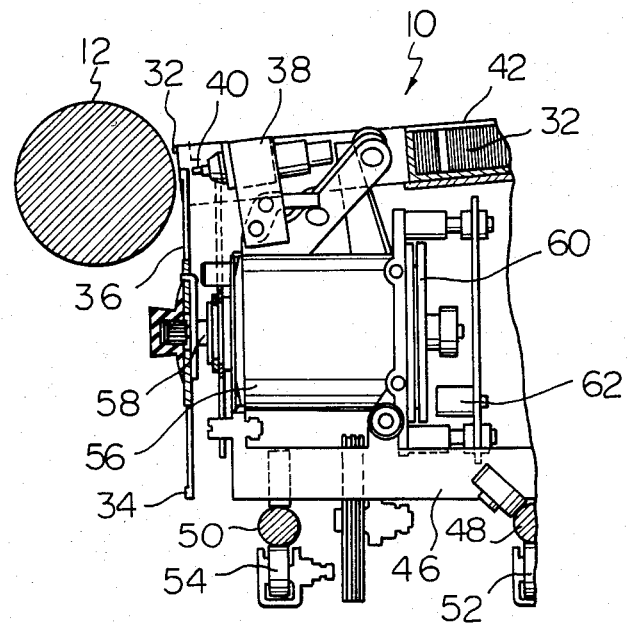
Figure 2C:
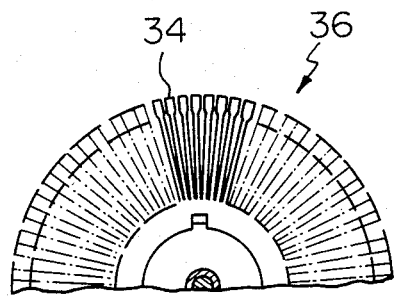
FIG. 2c is a front view of a print wheel installed in the printer.

Referring to FIGS. 2a, 2b and 2c, a printer is schematically illustrated to which the multi-phase stepping motor controller of the present invention is applicable. The printer includes a carriage 10 which is movable to the left and right in parallel with a platen 12. A stepping motor 14 drives the carriage 10 and serves the function of a spacing motor as is usually referred to as in this art. The angular output of the motor 14 is transmitted to the carriage 10 by a wire 16 via idle pulleys 18. The platen 12 is rotated about its axis by a stepping motor 20 via a gear 22 mounted on its associated shaft and intermeshed gears 24 and 26. The platen 12 may also be moved by hand using knobs 28 and 30.

A sheet of paper is inserted into the printer from behind the platen 12 and passed therearound by way of the underside. An inked ribbon 32, type elements 34 on a print wheel 36 and a hammer 38 are located to face the platen 12 with the intermediary of the paper sheet. When a solenoid associated with the hammer 38 is energized, a plunger 40 is bolted out the hammer 38 to impact a type element 36 against the paper sheet through the ribbon 32 thereby printing out a character on the sheet. Almost all the part of the ribbon 32 is housed in a ribbon cassette 42 which is mounted on the carriage 10. A ribbon motor 44 is operably connected to a shaft which is rotatable to change the relative position between the ribbon 32 and the hammer 38 and the like.

Details of the carriage 10 are illustrated in FIG. 2b. The carriage 10 comprises a base 46 which is slidably mounted on two support shafts 48 and 50 by bearings 52 and 54. A stepping motor 56 for type selection is rigidly mounted on the base 46 while the print wheel 36 is carried on an output shaft 58 of the motor 56.

As best shown in FIG. 2c, the print wheel 34 has a daisy shape and is formed with the type elements 34 along a circumference thereof. Each segment or finger of the type wheel 36 having a type element 34 will be temporarily deformed when the type element 34 is impacted by the hammer 38. The hammer 38 is fixed in such a position on the carriage 10 that its plunger 40 is aligned with a type element 34 in a predetermined print position.

The stepping motor 56 is provided with a rotation sensor 60 and a home position sensor 62 as illustrated in FIG. 2b. While the rotation sensor 60 produces a signal associated with a rotation of the motor 56, the home position sensor 62 is adapted to determine the initial or home position of the print wheel 34. Like the motor 56, the motor 14 is provided with a similar rotation sensor 64. A home position sensor 66 for determining the initial or home position of the carriage 10 is rigidly mounted on a framework of the printer and directly responsive to a position of the carriage, not the angular position of the motor 14.

Figure 3B:
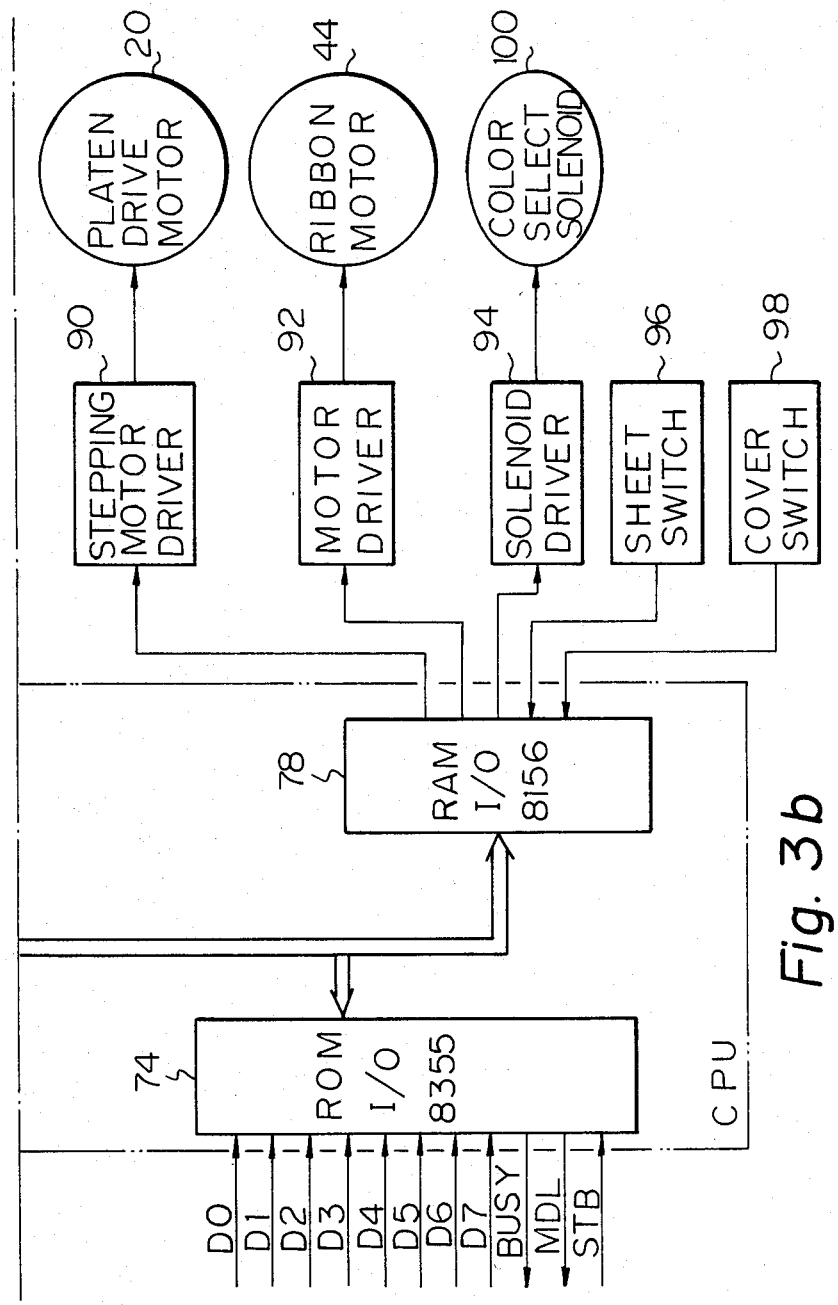

Referring to FIG. 3, the printer and a controller therefor are shown in block diagram. A control circuit 70 is constructed as a CPU which employs a microcomputer. The CPU comprises a microprocessor 72 constituted by 8085A, ROM & I/Os 74 and 76 each constituted by 8355, a RAM & I/O 78 constituted by 8156, etc. The I/O ports of the ROM & I/O 74 serve as a printer interface for data reception and comprise 8-bit data input terminals D0-D7, a ready for receive signal output terminal BUSY, a sheet sense signal output terminal MDL and a data receive timing signal input terminal STB. ROM of each ROM & I/O 74 or 76 stores a predetermined program therein for the operation of the printer. RAM of each RAM & I/O 78 may selectively serve as various storages such as a buffer memory for storing received data and a stack for the duration of a run of the program. The I/O ports of the other ROM & I/O 76 are connected to a sense amplifier 80, a stepping motor driver 82, a solenoid driver 84, a sense amplifier 86, stepping motor drivers 88 and 90, a motor driver 92, a solenoid driver 94, a sheet switch 96, a cover switch 98, etc.

The sense amplifier 80 amplifies an output signal of the rotation sensor 60 associated with the type select motor 56 and that of the home position sensor 62. These amplified signals are fed to the I/O ports of the ROM & I/O 76 included in the control circuit 70. As will be described in detail below, the stepping motor driver 82 is adapted to cause a predetermined current to flow through a predetermined excitation coil of the motor in response to a step pulse and a direction command signal CW/CCW, which are supplied from the I/O ports of the ROM & I/O 76 of the control circuit 70. The stepping motor drivers 88 and 90 are constructed in the same way as the stepping motor driver 82. The solenoid driver 84 responds to a print pulse fed from the I/O port of the ROM & I/O 76 by energizing the hammer solenoid by a pulse current at a predetermined timing. The sense amplifier 86 amplifies an output signal of the rotation sensor 64 responsive to the rotation of the carriage feed motor 14 and that of the home position sensor 66, supplying an output thereof to the I/O port of the ROM & I/O 76. The motor driver 92 drives the ribbon motor 44 to feed the ribbon 32 while the printer is in printout operation. The solenoid driver 94 energizes a solenoid 100 which is adapted for the selection of colors of the ribbon 32. The sheet switch 96 is responsive to the presence/absence of a sheet on the platen 12. The cover switch 98 is responsive to the opened/closed position of a cover for a housing of the printer. As the output of the switch 96 indicates "sheet absent" and/or that of the switch 98 indicates "cover opened", the CPU 70 stops the printout operation and generates a predetermined alarm.

Figure 4:
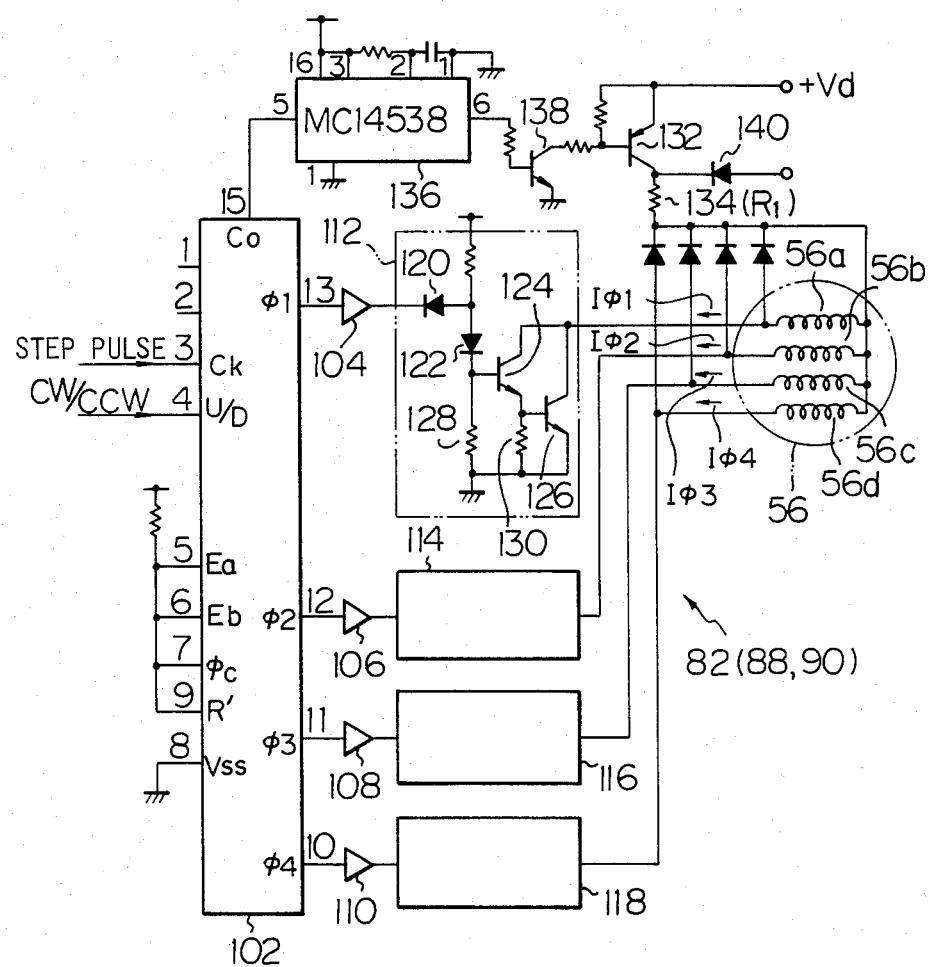
FIG. 4 is a block diagram showing in detail a stepping motor driver included in the arrangement of FIG. 3.

In accordance with the present invention, the stepping motor driver 82 (88, 90) may be constructed as shown in detail in FIG. 4. In this embodiment, a phase excite distributor circuit 102 comprises Universal Controller IC PMM8713 (Sanyo Electric Co. Ltd., Japan). Pins 5, 6 and 7 of the PMM8713 are pulled up to "H" level to select the alternating 1-phase, 2-phase excite mode for a 4-phase motor. Output terminals $\phi_1$, $\phi_2$, $\phi_3$ and $\phi_4$ of the distributor 102 are connected to power amplifiers 112, 114, 116 and 118 via amplifiers 104, 106, 108 and 110 respectively. Each of these power amplifiers is made up of diodes 120 and 122, transistors 124 and 126 and resistors 128 and 130. The output terminals of the power amplifiers (collectors of the transistors 124 and 126) are connected to one ends of exciting coils 56a, 56b, 56c and 56d of the motor 56 respectively. The other ends of the coils 56a-56d are connected together to the collector of a transistor 132 via a resistor 134. The resistor 134 has a resistance which is $1/\sqrt{2}$ the d.c. resistance r of each coil 56a-56d.

A monostable multivibrator 136 comprises a monostable multivibrator IC MC14538 (Motorola, U.S.A.). The multivibrator 136 is connected at its input terminal (pin 5) to a Co (input pulse monitor) terminal of the distributor 102 (PMM8713) and at its output terminal to the transistor 132 via a transistor 138. The transistor 132 receives at its emitter a d.c. constant voltage $+V_d$ for motor drive and at its collector a d.c. constant voltage $+V_h$ ($V_d > V_h$) via a diode 140. As the direction command signal CW/CCW output from the control circuit 70 instructs CW (clockwise) and step pulses are fed to a Ck terminal of the distributor 102, the phases $\phi_1$-$\phi_4$ are sequentially made high or excite level so that the transistors of the amplifiers 112, 114, 116 and 118 are turned on accordingly. Meanwhile, in response to a step pulse, the distributor 102 (PMM8713) produces a pulse signal at the Co terminal in response to which a pulse signal of a predetermined duration appears at the output terminal of the multivibrator 136 (MC14538). This pulse signal has the effect of turning on the transistors 138 and 132 for a predetermined period of time and, thereby, causing a current to flow through a coil 56a-56d, which is connected to an amplifier 112, 114, 116 or 118 then in "ON" state, via the resistor 134 whose resistance is $R_1$.

Supposing that phase $\phi_1$ is to become the high or excite level, a current $I_1$ will flow through the coil 56a during 1-phase excitation and a current $I_2$ during 2-phase excitation as produced by the following equations:

$$I_1 = V_d/(R_1+r)$$

$$I_2 = V_d/\{(R_1+r/2)\times 2\}$$

Because $R_1 = r/\sqrt{2}$ as previously stated, the currents $I_1$ and $I_2$ are respectively expressed as:

$$I_1 = V_d/\left(R_1\left(1+\sqrt{2}\right)\right)$$

$$I_2 = V_d/\left(\sqrt{2}\ R_1\left(1+\sqrt{2}\right)\right)$$

Figure 5:
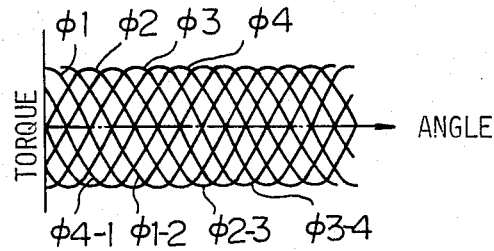
FIG. 5 is a torque diagram demonstrating the operation of the controller in accordance with the present invention.

From the above equations, $I_1 = \sqrt{2}\ I_2$ is induced. Such a variation of the exciting current allows the motor 56 to output an even torque as illustrated in FIG. 5. During 2-phase excitation ($\phi$ 1-2, $\phi$ 2-3, $\phi$ 3-4, or $\phi$ 3-1), the given current $I_2$ flows through each coil so that the torque developed by each two coils is proportional to the current $I_2$ multiplied by $\sqrt{2}$, as already stated. The torque produced during 1-phase excitation is common to the torque generated by the 2-phase excitation because the current $I_1$ flowing through one coil is $\sqrt{2}\ I_2$.

Figure 6:
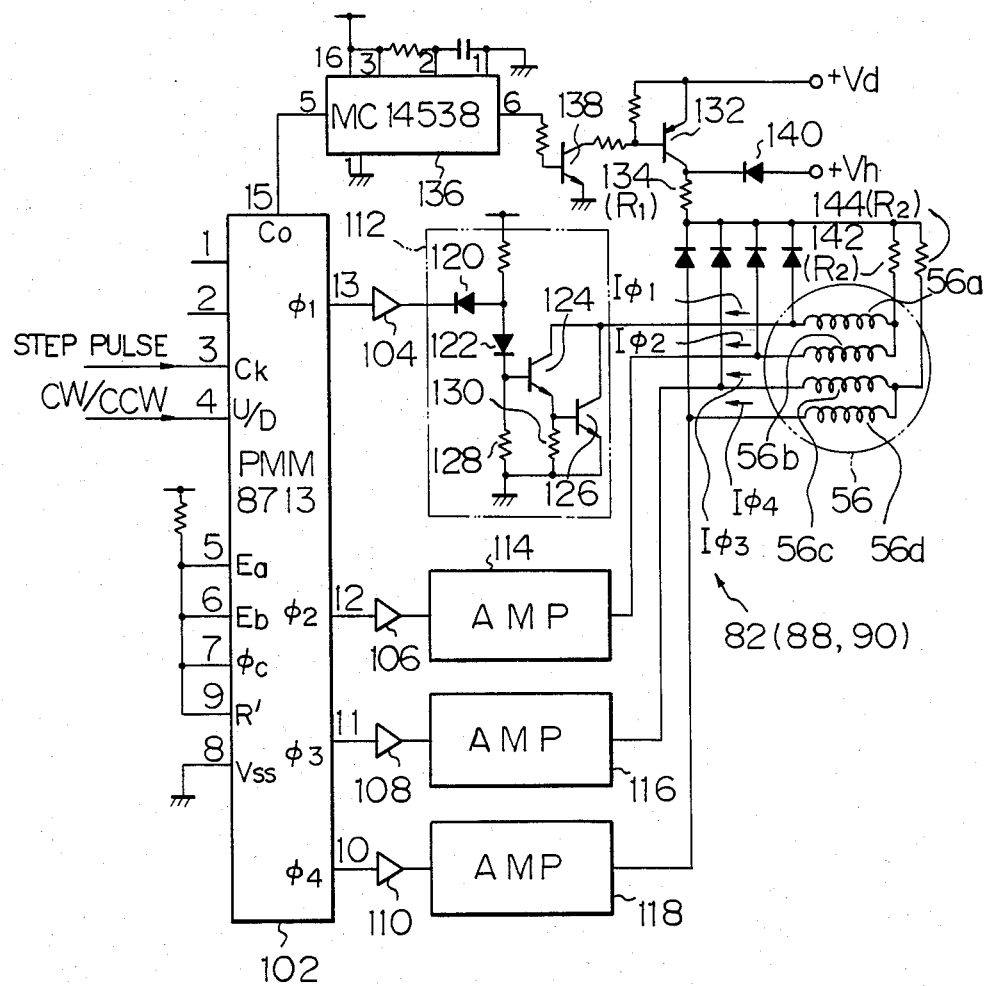
FIG. 6 is a block diagram of another embodiment of the present invention.

Referring to FIG. 6, another embodiment of the present invention is shown in which two resistors 142 and 144 each having a resistance $R_2$ are connected in series with the coils 56a-56d in order to improve the buildup characteristics of the currents to be supplied to the coils. In this case, the resistor 134 adapted for the adjustment of torque balance in the alternating one phase, two-phases excitation mode has to be modified in resistance compared to the first embodiment. In this embodiment, the resistance $R_1$ of the resistor 134 is selected to be $R_1 = (r+R_2)/\sqrt{2}$. The rest of the construction is common to that of the first embodiment.

Figure 7A:
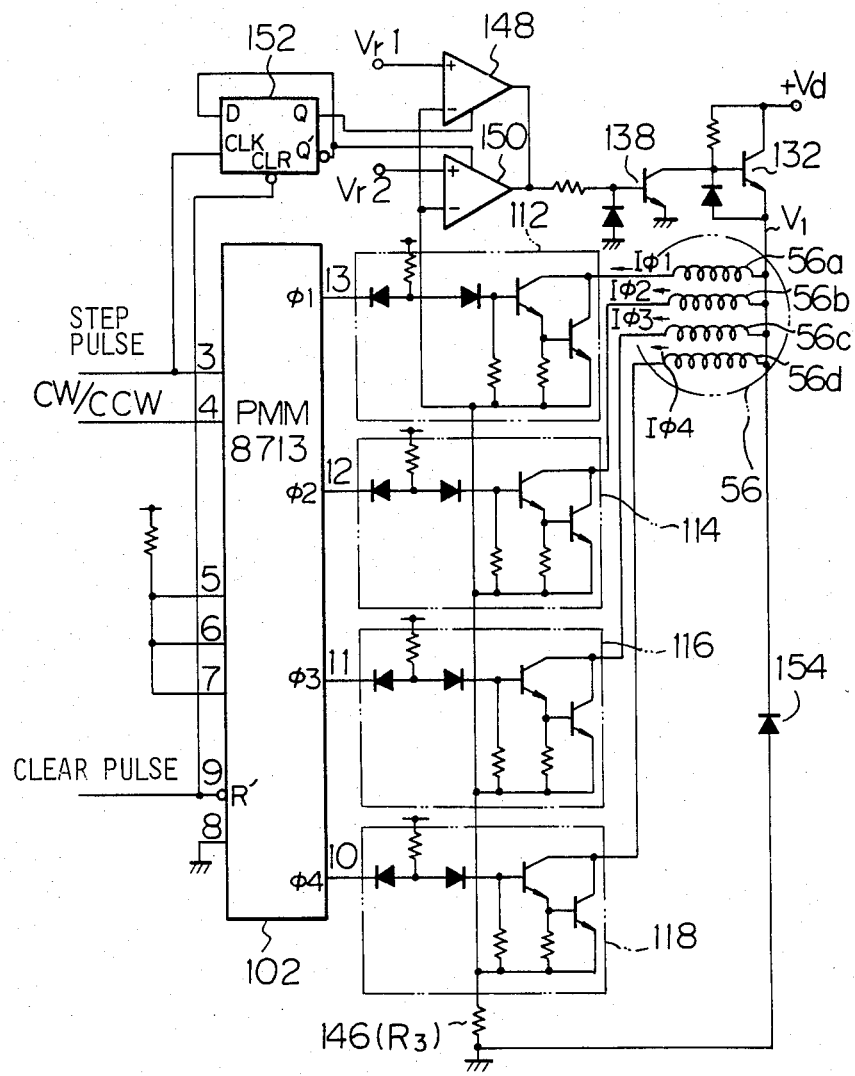
FIG. 7a is a block diagram of still another embodiment of the present invention.

Referring to FIG. 7a, still another embodiment of the present invention is shown. The operation of this embodiment is demonstrated in the timing chart shown in FIG. 7b. This embodiment is designed to excite the motor by the so-called PWM or chopper system. The amplifiers 112, 114, 116 and 118 for switching the low potential sides of the associated coils 56a-56d are connected together at their low potential sides and connected to ground via a resistor 146 having a resistance $R_3$. A comparator 148 having a gate compares the terminal voltage of the resistor 146 with a reference voltage $V_{r1}$, while a comparator 150 having a gate compares the terminal voltage of the resistor 146 with a second reference voltage $V_{r2}$. That two comparators 148 and 150 are switched over during control is contrastive to the ordinary PWM system in which use is made of a single comparator. The switchover is effected by a flip-flop 152 which is the D type flip-flop in this embodiment. The comparators 148 and 150 are selectively triggered depending upon the output of the flip-flop 152. The reference numeral 154 designates a free-wheeling diode which functions to supply a circulating current when the transistor 132 is non-conductive.

Figure 7B:
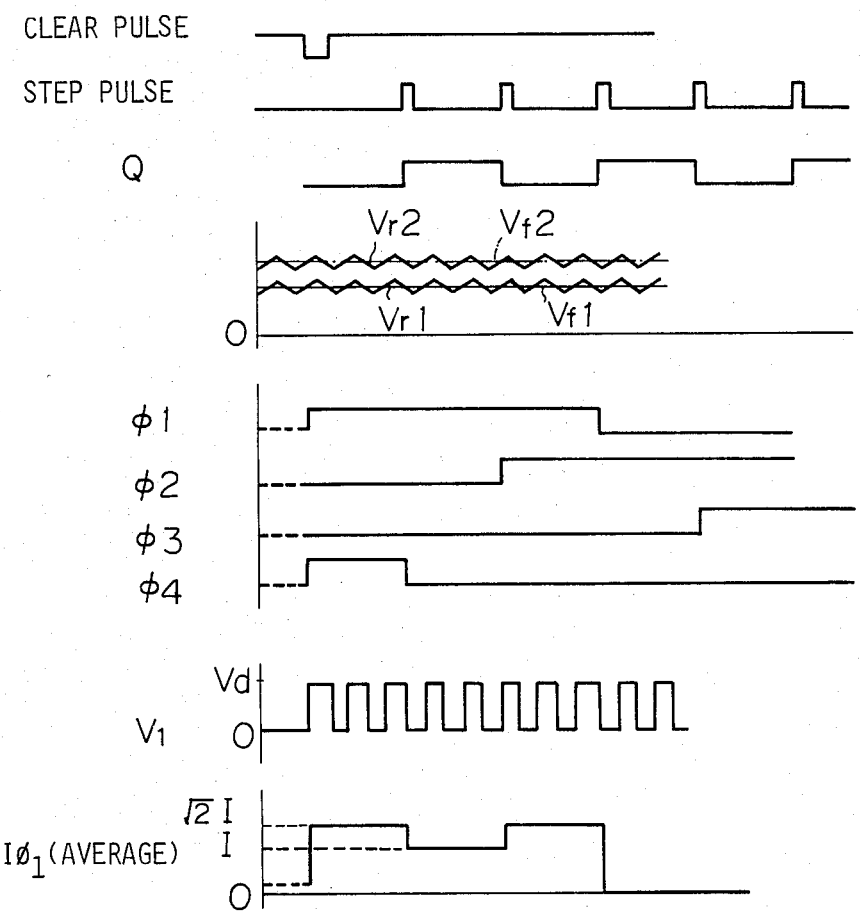

The operation will be described with reference to FIG. 7b. A clear pulse fed to the controller resets the flip-flop 152 and distributor 102. Then, the distributor 102 becomes high or excite level at its output terminals $\phi_1$ and $\phi_4$ and low or non-excite level at its output terminals $\phi_2$ and $\phi_3$, thereby exciting two phases at the same time. The flip-flop 152 becomes low level at its Q terminal and high level at its Q' terminal (inverted output of Q), in which condition the comparator 150 is selected. It will be recalled that the comparators 148 and 150 are applied with different reference voltages $V_{r1}$ and $V_{r2}$ ($V_{r2} = 2V_{r1}$) which are prepared by superposing sawtoothed signal voltages of small amplitudes on predetermined d.c. voltages.

As a current flows through any one of the coils of the motor, it causes a voltage drop across the resistor 146 and the resulting voltage $V_f$ is applied across the comparators 148 and 150. The comparator 148 or 150 selected by the flip-flop 152 compares the voltage $V_f(V_{f1}$ or $V_{f2})$ thus fed back with the reference voltage $V_{r1}$ or $V_{r2}$. If the voltage $V_f$ is lower than the reference voltage, the comparator 148 or 150 makes its output high level and, if not, low level. In response to the high level output of the selected comparator, the transistors 132 and 138 are turned on to cause a current to flow through a specific coil of the motor. Because both the reference voltages $V_{r1}$ and $V_{r2}$ constantly vary over small amplitudes, the outputs of their associated comparators 148 and 150 are varied in level in the binary mode to the periods of the saw-toothed voltages when the voltage $V_f$ reaches a predetermined level. The current flowing through the coil of the motor is varied in the binary mode timed to such a variation of the comparator output, so that the voltage $V_{f1}$ or $V_{f2}$ becomes balanced with the reference voltage $V_{r1}$ and $V_{r2}$. Stated another way, a current PWM-controlled to a pulse duration corresponding to the reference voltage $V_{r1}$ or $V_{r2}$ is allowed to flow through the transistor 132.

The flip-flop 152 changes state from Q to Q' or vice versa each time a step pulse arrives at the controller. The flip-flop 152 selects the comparator 150 in response to an even step pulse and the comparator 148 in response to an odd step pulse. As a result, the transistor 134 is supplied with a current corresponding to the reference voltage $V_{r2}$ during 2-phase excitation (even number), but with a current corresponding to the reference voltage $V_{r1}$ during 1-phase excitation (odd number).

Taking the coil 56a for example, the current to flow therethrough is $\sqrt{2}$ times larger in 1-phase excitation than in 2-phase excitation due to the relation $V_{r2}=\sqrt{2} V_{r1}$. This, as in the foregoing embodiment, causes a same torque to develop both in the 1-phase excitation and 2-phase excitation.

In summary, it will be seen that the present invention can excite a motor alternatingly in different numbers of phases without entailing any change in the average output torque. This realizes an optimum control over a stepping motor due to the ease of grasping hunting and like situations in a drive system.

Various modifications will become possible for those skilled in the art after receiving the teachings of the present disclosure without departing from the scope thereof. For example, a motor having five or more phases may be driven in any other suitable excitation mode. Where a motor having five phases are to be excited in the alternating one phase, two phases mode, the current to flow through each coil of the motor for one phase excitation may be 1.618 times the current which will flow through each coil for two phases excitation. Where it is desired to excite a motor having six phases in the alternating one phase, two phases mode, the current for one phase excitation may be 1.732 times the current for two phases excitation.

What is claimed is:

1. A stepping motor controller for controlling a stepping motor having multiple phases and excitation coils therefor in which m and n motor phases are alternately excited to drive the motor, comprising:
   excitation means for energizing m excitation coils at a first predetermined timing to excite the m motor phases and sequentially energizing n excitation coils at a second predetermined timing to excite the n motor phases; and
   control means for controlling the excitation means to energize the m and n excitation coils such that the magnitude of energization for the m excitation coils is equal to that of energization for the n excitation coils which is multiplied by a coefficient k which is greater than 1.

2. A controller as in claim 1, in which the coefficient k is determined by the number of the motor phases.

3. A stepping motor controller for controlling a stepping motor having multiple phases and excitation coils therefor in which m and n motor phases are alternately excited to drive the motor, comprising:
   excitation means for energizing m excitation coils at a first predetermined timing to excite the m motor phases and sequentially energizing n excitation coils at a second predetermined timing to excite the n motor phases; and
   control means for controlling the excitation means to energize the m and n excitation coils such that the magnitude of energization for the m excitation coils is equal to that of energization for the n excitation coils which is multiplied by a coefficient k which is greater than 1;
   the period of energization for the m excitation coils being different from that of energization for the n excitation coils, the period of energization for the m excitation coils being greater than that of energization for the n excitation coils where n is greater than m.

4. A controller as in claim 1, in which the excitation means comprises a resistor connected to the excitation coils and having a resistance which is determined in dependence on the coefficient k.

5. A controller as in claim 1, in which an excitation current for the m excitation coils is different from that of energization for the n excitation coils.

6. A controller as in claim 5, in which the excitation current for the m excitation coils is greater than that of energization for the n excitation coils where n is greater than m.

7. A controller as in claim 1, in which an excitation voltage for the m excitation coils is different from that of energization for the n excitation coils.

8. A controller as in claim 7, in which the excitation voltage for the m excitation coils is greater than that of energization for the n excitation coils where n is greater than m.

9. A controller as in claim 4, in which each of the excitation coils has an end which is connected to an end of the resistor whereby the resistor is connected in series with each of the excitation coils.

10. A controller as in claim 1, in which the excitation means further comprises means for sensing as magnitude of current flow through the excitation coils and comparing the sensed current with a first value when the m excitation coils are being energized and with a second value when the n excitation coils are being energized for PWM controlling a period of energization of the excitation coils, the first value being equal to the second value which is multiplied by the coefficient k.

11. A controller as in claim 10, in which n is greater than m.

* * * * *